Patented July 9, 1940

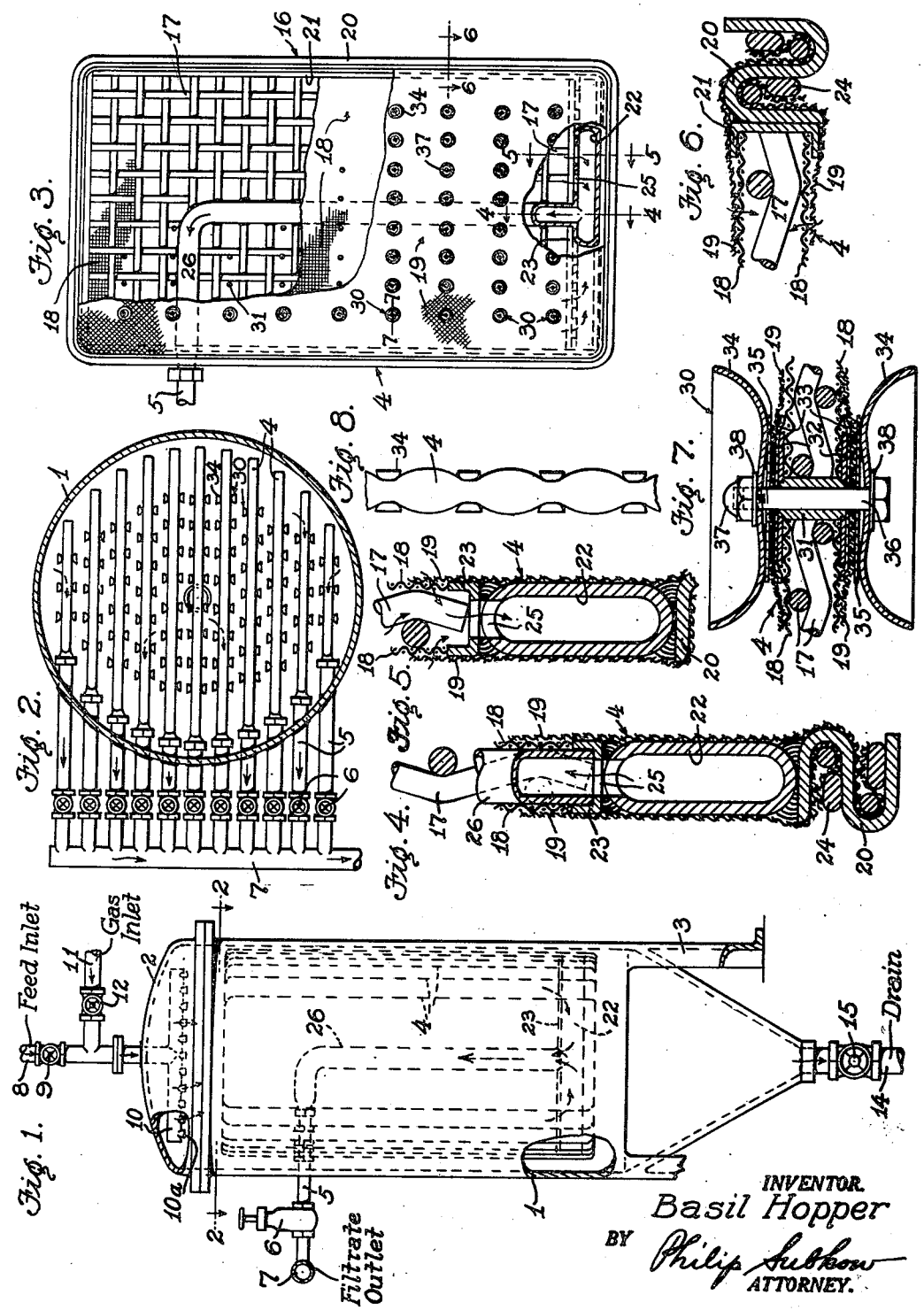

2,207,346

UNITED STATES PATENT OFFICE 2,207,346

FILTER

Basil Hopper, Palos Verdes Estates, Calif., assignor to Union Oil Company of California, Los Angeles, Calif., a corporation of California Application January 18, 1938, Serial No. 185,545

5 Claims. (Cl. 210—182)

The present invention relates to improvements in filters of the leaf type and has particular reference to an improvement in a leaf construction to be used in such filters.

In filter leaf construction it is conventional to provide filtering elements or canvas cloths on each side of the leaf which are supported on a frame consisting of a coarse metal screen. In a complete filter unit, a plurality of these filter leaves are suspended vertically in the filter shell very close to each other so as to provide as great a filtering area as possible for a given capacity of filter chamber.

In actual operation, the filter shell in which the filter leaves are suspended is first filled with the liquid medium containing solids in suspension to be filtered and then the further forcing of liquid medium into the shell or the application of pressure in the shell or vacuum on the filtrate discharge line results in forcing the liquid through the filtering elements into the central space between the opposite filtering elements or canvas cloths of each leaf where it is collected and forced from the filter unit through pipes conducted to the interior of each leaf. The solids collect on the surfaces of the filtering elements in the form of a coherent cake. This cake is usually discharged from the filtering elements by blowing back with a gas applied to the interior of each leaf at intervals which causes the filtering elements to be bulged. Unless the leaves are widely spaced, the filtering elements bulge against each other preventing proper discharge of the filter cake from the filtering elements. For this reason, it is common practice to fasten the filtering elements onto the metal screen by means of grommets spaced at frequent intervals over the surfaces of the filtering elements whereby this bulging of the filtering elements may be greatly restricted with the result that the leaves may be spaced closer. The grommets used are generally rivets or bolts provided with nuts and with flat metallic washers of larger diameter to form enlarged bearing surfaces for the fabric of the filtering elements.

I have observed that the blowing back of the leaves under gas pressure applied at intervals not only causes the canvas cloths to bulge outwardly but also causes the leaves to sway and strike each other with the result that quite often the heads of the bolts and nuts grind or poke holes in the canvas of adjacent leaves. I have also observed that canvas fatigue failure quite often results at the edges of the flat metallic washers due to the fact that bulging of the cloth causes the cloth to bend at a sharp angle from the edges of the flat washers.

I have discovered that by substituting the flat metal washers formerly employed with a cupped washer of larger diameter or a washer having a turned or curved edge that the canvas failure attending the use of flat washers is substantially completely eliminated and that the filter life of the filter leaf is greatly increased. The larger grommet area resulting from the use of cupped washers not only prevents the leaves from grinding holes in the canvas of adjacent leaves as the filters are bulged or flapped but the turned edge of the cupped washer gives a stream-lined bending of the canvas during bulging of the filtering elements with the result that canvas fatigue failure at the edge of the flat washers formerly used is eliminated.

It is thus an object of my invention to provide a filter leaf construction having a much better filter life than is possible with filter leaves of previous construction.

It is a further object of my invention to provide a grommet structure for filter leaves which will eliminate canvas fatigue failure caused by grommets heretofore employed and which will prevent the grommets from grinding or poking holes in the filtering elements of adjacent leaves employed in filters during bulging or flapping of the filtering elements.

It is a particular object of my invention to provide cupped washers or washers having turned edges in the place of flat washers heretofore employed in filter leaf construction.

Various other objects and features of my invention will be apparent to those skilled in the art by the following description of the invention taken from the drawing in which;

Fig. 1 represents an elevation of the filter;

Fig. 2 is a cross-sectional plan of the filter taken through lines 2—2 of Fig. 1 and showing a plurality of filters provided with cupped washers;

Fig. 3 represents an elevation of the filter leaf with parts broken away to show two screens, a filter element and the filtrate discharge pipe;

Figs. 4, 5 and 6 are sections of a part of the filter leaf taken respectively on lines 4—4, 5—5, and 6—6 of Fig. 3;

Fig. 7 is a section of the filter leaf taken on line 7—7 of Fig. 3;

Fig. 8 is a diagrammatic representation of a filter leaf with the filtering element in a bulged position and showing the streamlined bending of the canvas cloths.

Referring to the drawing, the filtering unit comprises a vertical cylindrical filter tank or shell 1 which is provided with a tightly fitted removable cover 2 and skirts 3 for supporting the tank. Suspended in the body of the vertical cylindrical shell are a plurality of filter leaves 4. Each filter leaf is connected to an outlet 5 provided with a valve 6 and each of the outlets are connected to a filtrate discharge manifold 7. Line 7 also serves for introducing blowing back gas into the center of the filter leaves for the purposes of removing the filter cake from the filtering elements. The filter shell is provided at the top with a line 8 and valve 9 which connects to a spray head or spider 10 disposed over the filter leaves and which is provided with a plurality of openings 10a. The openings 10a are disposed preferably between filter leaves so that a spray of material may fall between the filtering elements. Spray head 10 is employed for the purpose of introducing the mixture of fluid to be filtered into the filter shell. Line 11 controlled by valve 12 is for the purpose of introducing a gas into the filter shell as will hereinafter be described. The lower portion of the filter shell is preferably conical and is provided with a drain 14 controlled by valve 15.

Referring to Fig. 3, the filter leaf may consist of a peripheral frame 16 secured to a course screen 17 which holds the filtering elements apart and which permits the filtrate to drain into a receiver as will be hereinafter described. On each side of the coarse screen 17 are provided finer metal screens 18 which are provided for supporting filtering elements 19 on the outer sides of the finer screens. The filtering elements are usually of canvas cloth but may be of other suitable material. The peripheral frame 16 is preferably built up of a bar 20 of S-shaped cross-section which is welded to the channel bar 21 on all sides except at the bottom in which case it is welded to filtrate collector 22. The filtrate collector is preferably welded on its upper end to a channel bar 23. The coarse screen 17 is welded to the channel bars 21 and 23. The finer screen 18 is also welded to the channel bars. The filtering element 19 is secured to the filter leaf by disposing the ends in the grooves of the S-bar and weaving therein sash cord or cotton rope 24 as shown in Figs. 4 and 6.

At the base of the filter leaf there is provided a filtrate collector pipe 22 which comprises a flattened pipe and which receives the filtrate through openings 25. The filtrate collector is connected to a communicating vertical discharge pipe 26 which is secured to the coarse screen and which connects with the discharge pipe 5 and manifold 7.

Each of the leaves is provided with a plurality of grommets 30 distributed over the face of the filter leaf which are employed for the purpose of fastening the filtering element cloth onto the metal screens so as to prevent the filtering element from stretching or sagging under the influence of the weight of the filter cake which adheres to the outer surface of the filtering element cloth. These grommets also restrict the outward bulging of the filtering element when the filter cake is discharged by blowing back and thereby permits the filter leaves to be spaced closer in the filter shell without fear of adjacent filtering elements being forced against each other and preventing ready discharge of the filter cake from the filtering elements.

As shown in Fig. 7, each grommet is made up of a hollow spacer 31 which is provided with shoulders at each of its ends to receive metal washers 32. The hollow spacer and washers are disposed in the filter leaf between the interiors of the filtering elements 19. Preferably, cloth washers 33 of larger dimeter than the metal washers, are provided between the metal washers 32 and the filtering elements 19 in order to protect the interior surfaces of filtering elements against the grinding action of the metal washers during flapping or bulging of the leaves. The cupped washers 34 forming the particular improvement of my invention are placed against the outer surfaces of the filtering elements. Preferably, however, cloth washers 35 are placed between the outer surfaces of the filtering elements and the cupped washers to prevent leakage around the shanks of the bolts 36. The entire assembly of the spacer and washers is held together by means of a bolt 36 which extends through holes provided in the cupped washers, the flat washers, the spacers and the screws and filtering elements and is fastened by means of a cap nut 37. Metal washers 38 are also provided between the cap nut and also the head of the bolt and the cupped washers. The cap nut and the head of the bolt are preferably of smaller thickness than the height of the cupped washer so as to prevent the cap nut and the head of the bolt from extending beyond the peripheral edge of the cupped washer. The edge of this washer is preferably rounded. As shown in Fig. 3, it is preferable to dish the bottom of the cupped washer upwardly so that when the grommet assembly is fastened tightly by means of the bolt, a slight tension will be placed against the head of the bolt and the cap nut thereby preventing loosening of the bolt.

In operation, valves 12 and 15 are closed and valve 9 is opened to permit the introduction of the material to be filtered, for example, a chilled slurry of oil, solvent and precipitated wax, into the filter chamber. The introduction of the slurry is continued until the chamber is completely filled with slurry, after which the further introduction of slurry forces the oil and solvent through the filtering elements or canvas cloths 19 and through the finer screens 18 into the space between the finer screens. The filtrate then trickles down the coarser screens 17 into filtrate collectors 22 through openings 25 and is then forced up through the vertical pipe 26 to discharge pipe 5 and manifold 7 from which it may be passed to an evaporator (not shown) for separating the solvent from the oil.

The filtration is continued until a wax cake of about one-half to one inch thick is built on the filtering elements at which time the flow of chilled mixture containing the precipitated wax is stopped by closing the inlet valve 8 and opening the drain valve 15 to draw out all liquid in the filter shell. Valve 15 is then closed and valve 12 is opened to permit of blowing gas into the filter shell. Gas is then blown via line 11 through the wax cake until the wax cake has been dried of entrained oil and solvent.

Upon completion of the blowing operation, the flow of gas through line 11 is discontinued and then the filter cake is removed from the filter leaves. In order to accomplish the latter, a reversed flow of gas is resorted to. This is accomplished by closing valves 8, 12, and 15 and opening valve 6. Gas pressure and vacuum are then alternately applied to the interior of the filter leaves via lines 7 and 5, pipes 26, filtrate collectors 22 and then through openings 25 and up through the coarse screen 17, through finer screens 18 to the filtering elements 19. The alternate application of pressure and vacuum in the interior of the leaves causes the filtering elements to alternately bulge and contract which is known as "flapping." This causes the filter cake to be dislodged from the filtering elements and to fall to the bottom of the filter chamber from which it may be removed via line 14 and valve 15.

As stated heretofore, the alternate bulging and contraction of the filtering elements is accompanied by a swaying of the leaves in the filter shell which causes adjacent leaves to strike each other. With the use of flat washers in the place of the cupped washers, the grommet nuts poked or ground holes in the filtering elements of adjacent leaves, whereas the present larger grommet area presented by the cupped washers prevents the nuts from grinding holes in the filtering elements of adjacent leaves as the filters are flapped. By suitably distributing the grommets over the surfaces of the filter leaves and arranging the filter leaves in the filter shell so that the cupped washers of adjacent leaves are directly opposite each other, the cupped washers may be made to strike each other rather than to strike the canvas cloths or filtering elements. However, if the grommets are not placed in this manner, the cupped washers prevent the nuts from striking the canvas cloths.

Another advantage in the use of the cupped washers resides in the elimination of canvas fatigue failure at the edges of the washers. When flat washers are employed, the bulging of the canvas cloths causes the edge of the washer to rub in the canvas cloth with the result that the canvas at the edge of the flat washer is soon weakened.

The present turned edge of the cupped washer gives a streamlined bending of the canvas during the bulging of the filtering elements as shown in Fig. 8 so that canvas fatigue failure has been entirely eliminated.

It will be observed that while the cupped washers are of larger diameter than the flat washers heretofore employed, the filtering area of the filter leaf is not lessened due to the fact that the area of the filtering element directly below the curved portions of the cupped washers is still available for filtration. In other words by providing a cupped washer having its flat bearing portion of no larger diameter than the diameter of flat washers heretofore employed, the same filtering area is available and yet the protective advantages of a larger washer are obtained.

While I have described a preferred embodiment of my invention, it will be understood that this description is not to be considered as limiting as many variations may be made by those skilled in the art without departing from the spirit of my invention.

I claim:
1. A filter leaf comprising a central drainage member, a cover of filter fabric thereover and a plurality of grommets provided with rigid washers having convex surfaces of substantial extent said surfaces being in contact with the filter fabric, the peripheral edges of said washers being substantially out of contact with the filter fabric.

2. A filter leaf comprising a foraminous plate, a cover of filter fabric thereover and means to fasten said filter fabric onto said foraminous plate, said fastening means including metallic washers for forming enlarged bearing surfaces and said washers having convex surfaces of substantial extent said surfaces being in contact with the filter fabric, the peripheral edges of said washers being substantially out of contact with the filter fabric.

3. A filter leaf comprising a foraminous plate, a cover of filter fabric thereover, means distributed over the face of the filter fabric for fastening said fabric onto said plate, said means comprising fastening members extending through said foraminous plate provided with enlarged heads and cupped rigid washers between said enlarged heads and said filter fabric said washers having convex surfaces of substantial extent said surfaces being in contact with the filter fabric, the peripheral edges of said washers being substantially out of contact with the filter fabric.

4. A filter leaf comprising a screen, a cover of filter fabric over the surfaces of both sides of said screen, fastening means distributed over the surfaces of said covers and extending through said screen, said fastening means being provided with enlarged heads and cupped rigid washers intermediate said enlarged heads and said filter fabric, the peripheral edges of said cupped washers being above top of said enlarged heads said washers having convex surfaces of substantial extent said surfaces being in contact with the filter fabric, the peripheral edges of said washers being substantially out of contact with the filter fabric.

5. A filter leaf comprising a centrally disposed, rigid, foraminous metal screen capable of supporting outer filtering fabric, said filtering fabric enclosing said metal screen and forming an interior drainage chamber for filtered liquid drawn through the fabric on the opposite faces of the leaf, means distributed over the face of the leaf for securing the outer fabric to the metal screen, said means including cupped rigid washers said washers having convex surfaces of substantial extent said surfaces being in contact with the filter fabric, the peripheral edges of said washers being substantially out of contact with the filter fabric.

BASIL HOPPER.